(12) United States Patent
Sigona et al.

(10) Patent No.: US 10,675,564 B1
(45) Date of Patent: Jun. 9, 2020

(54) FILTER SYSTEM

(71) Applicant: PERFECT WATER TECHNOLOGIES, INC., Scottsdale, AZ (US)

(72) Inventors: Jon-Andrew Vincent Sigona, Scottsdale, AZ (US); Salvatore V. Sigona, Scottsdale, AZ (US)

(*) Notice: Subject to any disclaimer, the term of this patent is extended or adjusted under 35 U.S.C. 154(b) by 0 days.

(21) Appl. No.: 16/423,637

(22) Filed: May 28, 2019

(51) Int. Cl.
| | | |
|---|---|---|
| *B01D 24/16* | (2006.01) | |
| *C02F 1/00* | (2006.01) | |
| *B01D 39/06* | (2006.01) | |
| *B01D 35/30* | (2006.01) | |

(52) U.S. Cl.
CPC .......... *B01D 24/16* (2013.01); *B01D 35/306* (2013.01); *B01D 39/06* (2013.01); *C02F 1/003* (2013.01); *B01D 2101/02* (2013.01)

(58) Field of Classification Search
CPC ........ B01D 24/10; B01D 24/16; B01D 24/18; B01D 24/183; B01D 29/11; B01D 29/114; B01D 29/15; B01D 29/33
USPC ................................ 210/282, 287, 288, 439
See application file for complete search history.

(56) References Cited

U.S. PATENT DOCUMENTS

| | | | |
|---|---|---|---|
| 2,087,157 A | | 7/1937 | Lind |
| 2,304,453 A | * | 12/1942 | Gudmundsen ............ C02F 1/42 210/282 |
| 2,379,582 A | * | 7/1945 | Kracklauer ............ B01D 27/00 210/105 |
| 2,966,990 A | * | 1/1961 | Sicard .................. B01D 29/114 210/443 |
| 3,254,771 A | * | 6/1966 | Sicard .................... B01D 15/00 210/266 |
| 3,266,628 A | | 8/1966 | Price |
| 3,380,593 A | * | 4/1968 | Uhen ..................... B01D 27/02 210/356 |
| 5,037,547 A | | 8/1991 | Burrows |
| 5,236,595 A | | 8/1993 | Wang et al. |
| 5,328,609 A | | 7/1994 | Magnusson et al. |
| 5,401,401 A | | 3/1995 | Hickok et al. |
| 8,506,807 B2 | | 8/2013 | Lee et al. |
| 2012/0055862 A1 | | 3/2012 | Parekh et al. |
| 2012/0145624 A1 | | 6/2012 | Chang |
| 2013/0092636 A1 | | 4/2013 | Festner et al. |
| 2014/0144824 A1 | | 5/2014 | Shaffer |

(Continued)

FOREIGN PATENT DOCUMENTS

| | | |
|---|---|---|
| EP | 3070058 A1 | 9/2016 |
| EP | 3178790 A1 | 6/2017 |

(Continued)

*Primary Examiner* — Benjamin M Kurtz
(74) *Attorney, Agent, or Firm* — Bycer Law, PLC; Matthew L. Bycer

(57) ABSTRACT

A novel fluid filter includes a partially permeable elastic bag encapsulating a filtration medium, and providing pressure to prevent channeling. A receiver with one or more apertures fits at least partially within the filtration bag to receive treated fluid. A cover may be placed over a tube of the receiver to prevent filtration medium from exiting system. An upper portion of the filtration bag is impermeable, while the lower portion of the bag is permeable. The fluid path flows over the top and up through the lower section and through a major path through the filtration medium.

19 Claims, 9 Drawing Sheets

(56) References Cited

U.S. PATENT DOCUMENTS

| | | | |
|---|---|---|---|
| 2014/0251891 A1* | 9/2014 | Rickenbach | B01D 24/10 210/282 |
| 2015/0353383 A1 | 12/2015 | Hirsch et al. | |
| 2018/0194646 A1 | 7/2018 | Camp et al. | |

FOREIGN PATENT DOCUMENTS

| | | |
|---|---|---|
| FR | 2636940 A1 | 9/1988 |
| JP | 2005138064 A | 6/2005 |

* cited by examiner

FILTER SYSTEM

BACKGROUND OF THE INVENTION

1. Field of the Invention

The present disclosure is related to fluid filtration systems. More particularly, the present disclosure is related to in-line filter systems for potable water treatment.

2. Description of Related Prior Art

Multiple in-line water treatment systems have been devised for improving the nature, characteristics, taste, or safety of potable water. Many of these systems are built into a pressured water source, e.g. water supply, municipal water systems, etc. In-line water treatment systems may be used at the entry to a building, or home, or may be installed immediately prior to a dispensation outlet, such as under-sink, faucet, bathroom, kitchen, hose bib, etc. In-line systems typically interrupt the flow, to divert most or all incoming water through the filtration system. Filtration systems in the art may include single stage, or multiple stage, conditioning systems. Filters can either remove certain attributes of the water (e.g. mechanically strain particles, bind chlorine, precipitate metals, etc.) or add characteristics to the water (modification of pH, softeners, improve taste profile, etc.). Once passing through the water treatment system, the water may then re-enter the water system for supply and use.

Water treatment filter systems include modular filters, as are known in the art. A single filter module may include a container housing a filter. The container couples (often via levered threading) with a cap. The cap may perform much of the fluid management and includes both an inlet (to direct water into the filter), and an outlet (for water to re-enter the water supply line). Fluid passes through the cap into the container, through the filter, and up through a central passage in the bottom of the cap, wherein the cap directs the fluid through an exit back to the water line. The cap is typically directly plumbed to a source line.

Given the nature of in-line filter systems, two primary modes of filters are used. One method includes axial flow filters. Axial, or linear, flow filters force the fluid flow through a filtration medium wherein the incoming fluid enters the filter at a first end and exits through a second end. A benefit of axial flow filtration systems is that the fluid must pass through a large portion of, or take a longer path through, the filtration medium prior to exiting. This increases the exposure of each molecule of the fluid to potential interaction with the filtration medium. However, axial flow filters suffer a drawback of both pressure loss and slowing the flow velocity. Axial flow filters are more susceptible to channeling and bypassing within the filter as the filtration medium is subject to more force.

An alternative filter system commonly used in the art includes radial flow filters. Radial flow filters may include a cylinder, whereby fluid passing through the radial filter must only pass through the radial length from any direction along a single plane transverse a longitudinal axis along the filter. Radial flow allows water to flow from the entire outside of the filter through to the core providing an order of magnitude more surface area contact than axial flow designs. With increased surface area, different mesh size carbon powders can be used in combination with other filtration medium without suffering much reduction of pressure. The water moves slowly through a consistent (often solid block) membrane, yet the flow rates remain high due to the greater exposed surface. The vast amount of surface area available in radial flow filters, paired with the minimal length of passage through the filter, or filtration medium, leads to low pressure loss and high volume velocity. However, the drawback of radial flow filters is the limited path through the filtration medium, and thus a reduced filtration process.

Therefore, there is a need for a filter system that can retain a high velocity of fluid flow, while simultaneously enhancing filtration medium exposure. In order to provide a fast flow with optimal filtration, a new filter system that could increase surface area exposure over axial flow filters and at the same time improve the path length of the minimum path through the filter would be particularly advantageous.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

The present invention includes a unique novel and non-obvious improvement on modular filtration systems, as typically seen in potable water industries. The invention includes using a waterproof material to direct fluid flow through a filtration medium while combating channeling via an inwardly pressurized elastic filtration bag. The filtration system can be used with a proprietary, or a common, filter canister including a filtration medium. The filtration medium may be replaceable or reusable. The container (or cannister housing) for the filtration medium described herein is provided for exemplary purposes only, and is not intended to limit the present invention. A preferred container would be a filter unit container that includes two pieces, a bottom housing and top cap. Candlewick-style filters may be used whereby the cap can cause entry of fluid in a (circular) ring positioned around a central aperture, the cap central aperture providing egress of treated fluid. Preferably, the cap can be used to couple with, and interrupt, a water supply to provide an inlet and outlet. The cap directs the flow of water supplied from the water source into the container wherein the water passes through a filter, and then out through an outlet in the cap back into the water line. Alternatively, the present invention may include a unique candlewick top. A filter receiver can couple directly to the water source (line), thus obviating the need for a separate cap. In this manner, the filter receiver may mate with both the water supply/exit and seal the container.

The filter receiver is preferably coupled to the outlet, often on the underside of the cap, to provide for fluid to flow into the container, and then, from within the container through the filter and filter receiver (and back into the cap) and then through the outlet to return to the main line. In some embodiments, the filter receiver may connect to a filtration medium (i.e., the filter receiver may serve as an anchor or mounting point such that a filtration medium can couple to the filter receiver), wherein the filtration medium can surround a portion of the filter receiver. Fluid entering the system fills the space around the filter, passes through the filtration medium into the filter receiver, and then can be supplied through the cap.

Figure 1:
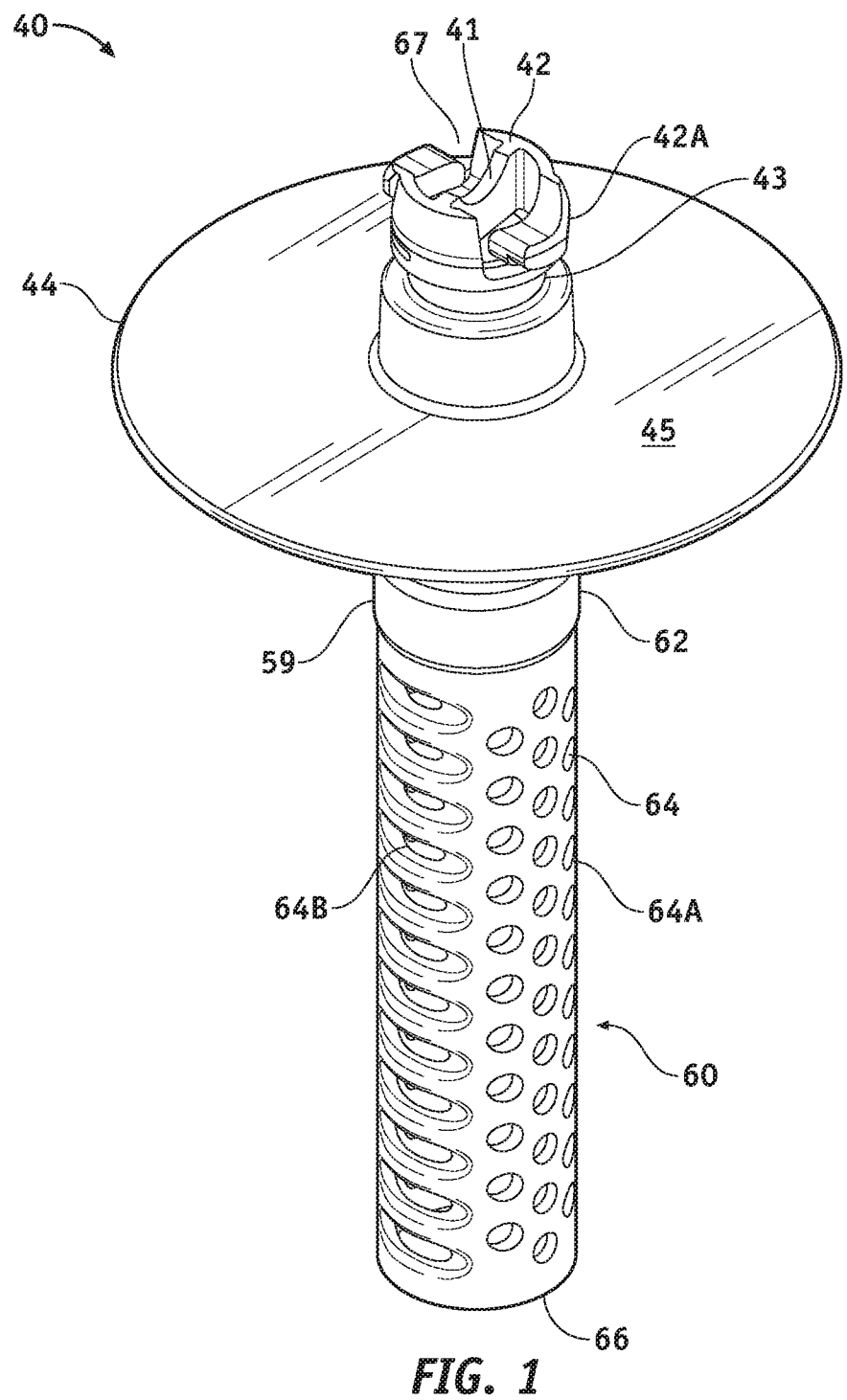
FIG. 1 illustrates a perspective view of a filter receiver consistent with several embodiments of the present disclosure.
Figure 2:
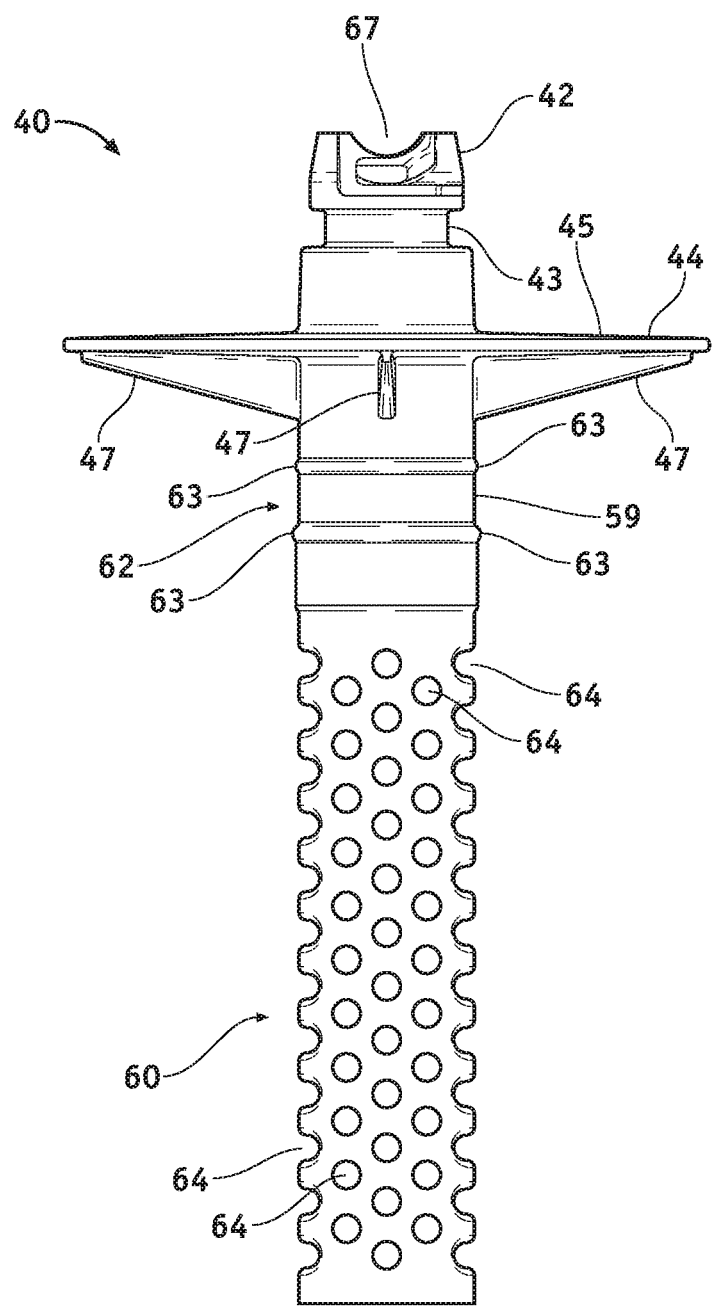
FIG. 2 illustrates a side view of the filter receiver as shown in FIG. 1.
Figure 3:
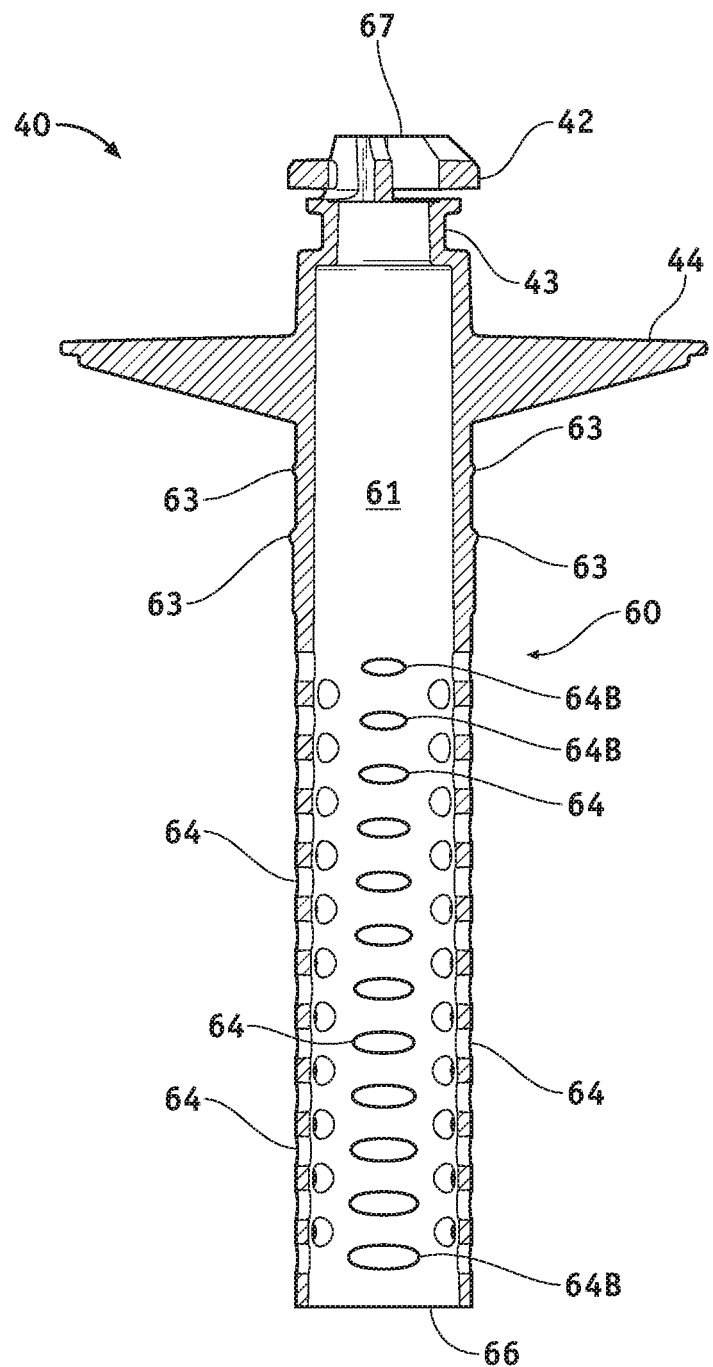
FIG. 3 illustrates a cross-sectional side view of the filter receiver as shown in FIGS. 1 and 2.

Referring now to FIGS. 1-3, a filter receiver 40 is shown. Filter receiver 40 generally includes a male coupler 42 that can mate with the underside of a filter system cap 12. In a preferred embodiment, male coupler 42 includes angled, or levered, threads 42A to mate with a complementary female threaded coupling in the underside 20 of cap 12. Shield 44 may be placed below male coupler 42 and above remaining portions of filter receiver 40, such as central hollow tube 60. Shield 44 includes upper surface 45 providing a physical flow obstacle to direct incoming fluid provided from a cap inlet. This advantageously prevents dislodging portions of the filter or filtration medium. Upper surface 45 allows the fluid (such as water) to flow into the remaining space of a container (not shown) and around the filter. In addition, gasket 39 (shown in FIGS. 7 and 9) may be included between shield upper surface 45 and cap underside 20 to provide a seal between filter receiver 40 and cap 12. Similarly, shield lower surface 46 forces fluid to remain below shield 44 and causes pressure radially and linearly to cause fluid to pass through filtration medium 49 into tube 60.

Tube 60 includes numerous apertures 64, which may include circular apertures 64A arranged in an honeycomb array (i.e., a circular diagonal array) as shown. In some embodiments, apertures 64 are approximately circular (i.e., within a standard measure of error, such as 5%), but in alternative embodiments apertures 64 may be other shapes. For example, triangular or hexagonal apertures 64 may result in improved structural integrity of tube 60 or reduce material or manufacturing costs at the expense of flow efficacy. Elongated apertures 64B may also be included and arranged opposite one another one hundred-eighty degrees around tube 60. Depending upon the dimensions of the apertures 64 and tube 60, apertures 64 may not necessarily be evenly spaced; in alternative embodiments apertures 64 are irregularly placed (i.e., misaligned and/or patternless), though they may be less effective.

It is contemplated that treated fluid will enter from outside filter receiver 40, through apertures 64, into tube interior 61 (such as a central cavity) to pass upwards through tube 60 and out upper access hole 67 through male coupler 42. Tube 60 preferably includes neck 62 whereby a filtration bag 50 containing filtration medium 70 can be affixed thereon. Tube 60 may include a lower aperture, such as lower access hole 66, to provide for fluid to pass through the bottom of tube 60. Alternative embodiments include a closed lower portion (such as a plate) in tube 60 to negate the use of lower hole 66 and force the use of apertures 64.

Neck 62 preferably includes a ridge, or a pair of ridges 63 (as shown), or ribs, whereby a cinch may be applied thereon and therebetween to secure the filtration bag. A single rib may be used, in such instance, preferably above the cinching point. Given the directional forces applied to shield 44, shield supports 47 may be placed on the lower surface 46 to prevent buckling, bending, or other movement of shield 44 when force is supplied from incoming fluids. Shield supports 47 may be formed in a plurality of ways, as will be understood by those skilled in the art, such as triangular, curved, fluted, etc. In a preferred embodiment, four shield supports 47 are disposed in a ring, spaced evenly (i.e., every 90°), as shown in FIG. 2. Other embodiments including fewer or additional shield supports 47 are fully considered herein (e.g., two supports, three supports, five or more supports, etc.). In some embodiments, depending upon materials used and/or expected pressures, shield supports 47 may not be necessary, as will be understood by those skilled in the art.

Figure 4:
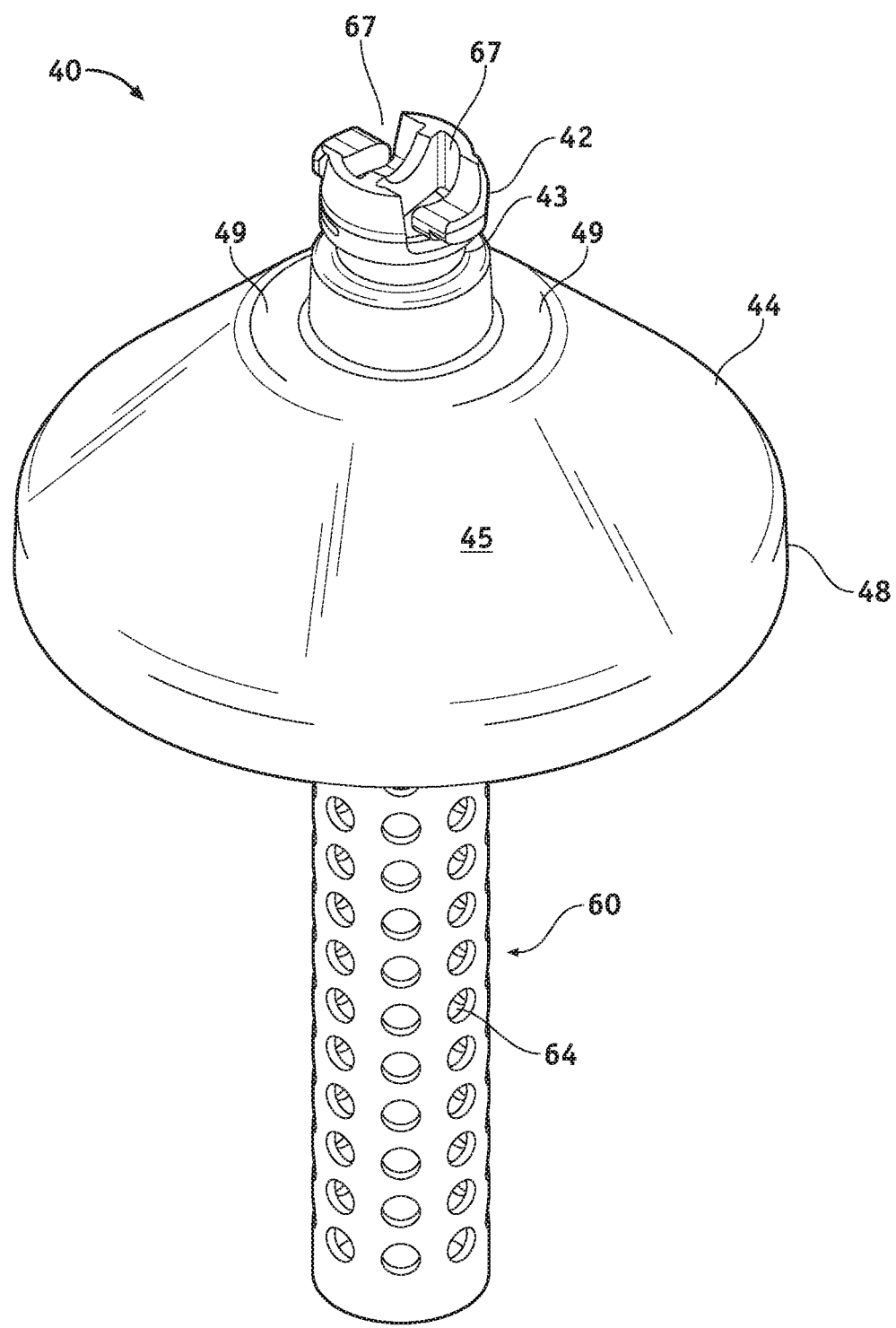
FIG. 4 illustrates a perspective view of a filter receiver according to an alternative embodiment of the present disclosure.
Figure 5:
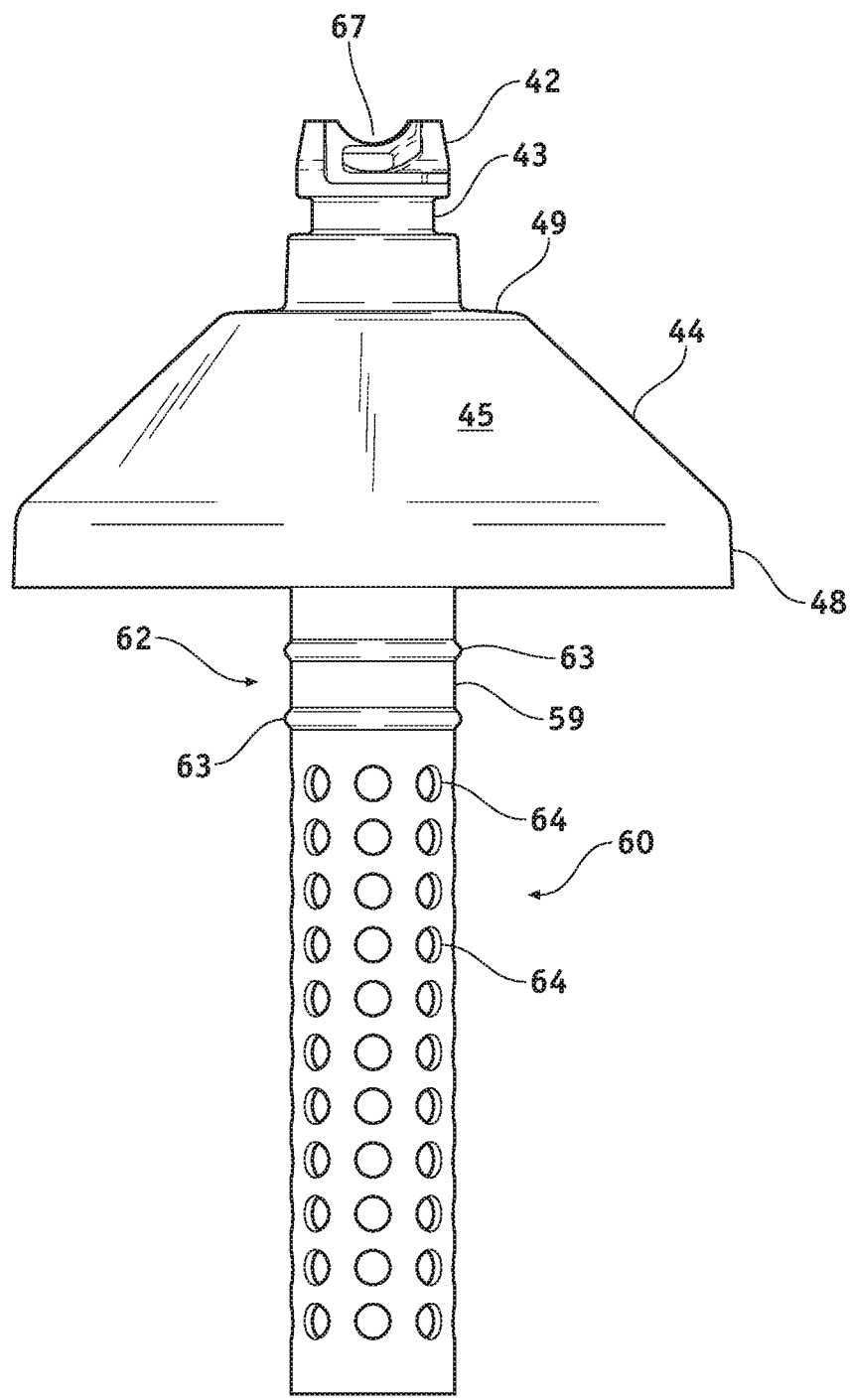
FIG. 5 illustrates a side view of the filter receiver as shown in FIG. 4.
Figure 6:
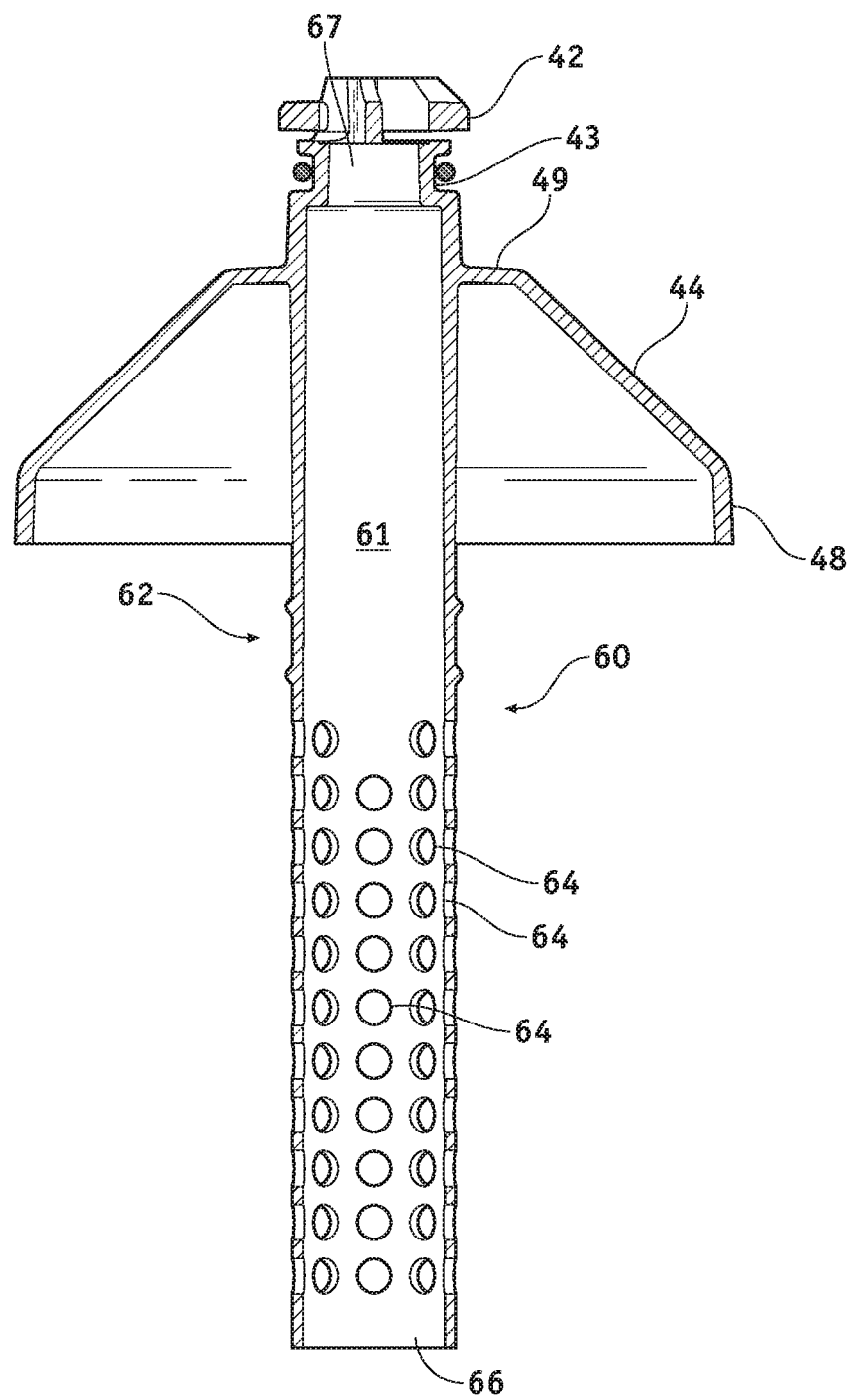
FIG. 6 illustrates a cross-sectional side view of the filter receiver as shown in FIGS. 4 and 5.

Referring now to an alternative embodiment in FIGS. 4-6, alternative filter receiver 40 is shown. Alternative filter receiver 40 may include a single set of apertures 64 along tube 60 wherein apertures 64 are circular holes in a ringed array (i.e., a circular array). Apertures 64 may be set in aligned formation or otherwise arrayed or in any arrangement that will facilitate the movement of fluid from outside tube 60 into tube interior 61.

A major feature of the alternative filter receiver 40 in FIGS. 4-6 includes the shield 44 having an elongated upper surface 45. Shield 44 may be angled to resemble a conical section. This angled shield shape further deflects incoming fluid from above and outwards from the longitudinal line of tub 60. Fluid is thus directed down and out from upper surface 45 regardless of location of the cap inlet and inflowing fluid. Additionally, shield 44 may include straightened rim 48 to protect or otherwise contain filtration medium 70 and filtration bag 50. Alternative shield 44 may similarly include shield supports 47, analogous to those depicted in FIG. 2 and described above.

Figure 7:
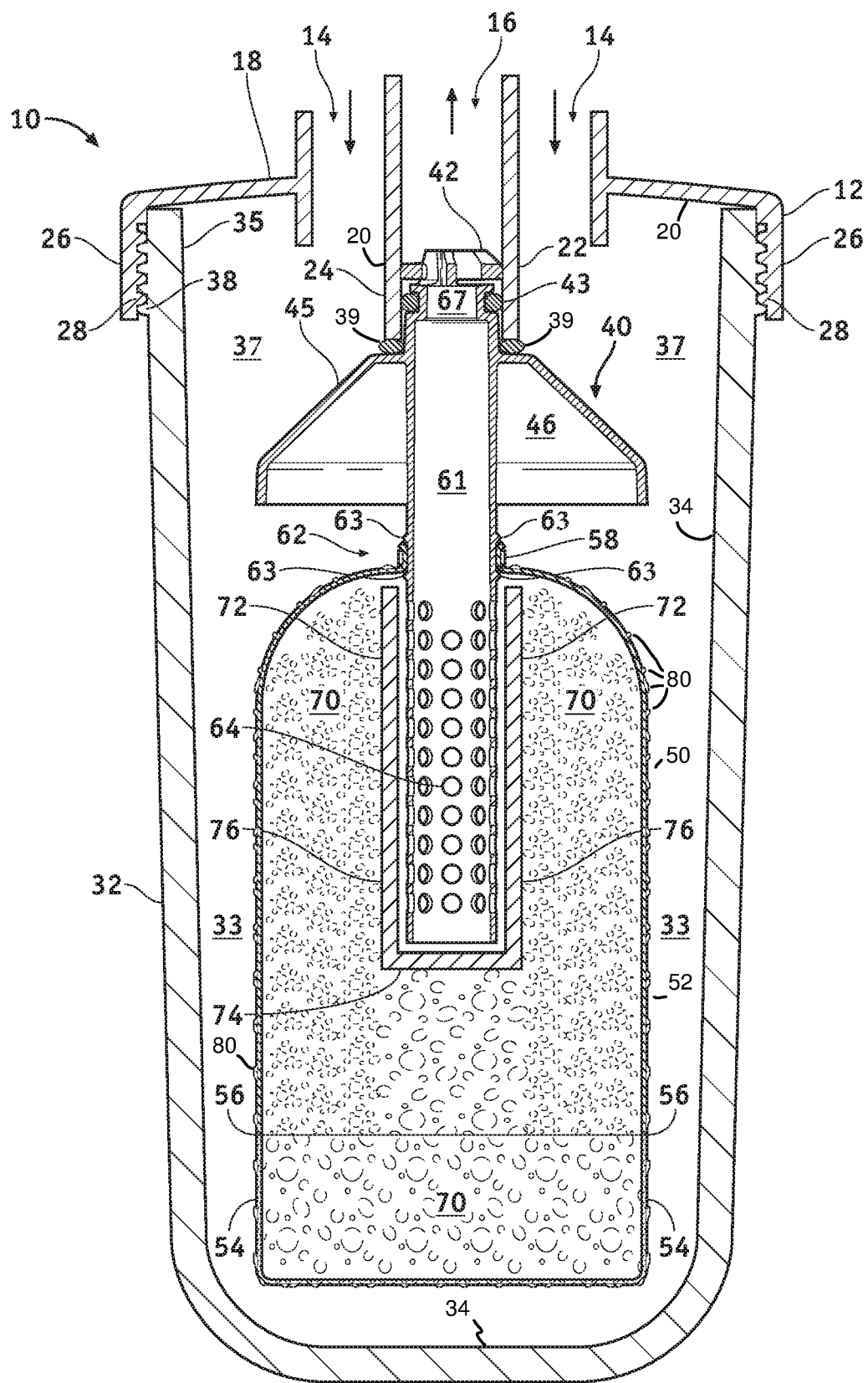
FIG. 7 illustrates a cross-sectional side view of a filtration module encapsulating the filter receiver as shown in FIGS. 4-6.

Referring now to FIG. 7, modular filter unit 10 is shown. Filter unit 10 includes cap 12 and container 32. Cap 12 includes an inflow source of fluid provided through inlet 14 into container upper region 37. Container general region 33 may serve in part as a sump. Fluid passes shield 44 and enters retention bag 50 to pass through filtration medium 70, through cover 72, through apertures 64, into tube interior 61. Retention bag 50 includes upper layer (or section) 52 which is fluid-impermeable and lower section 54 which is fluid-permeable. As retention bag 50 may be waterproof and lower layer 54 is more elastic than upper section 52, fluid may generally pool into lower section 54 before being forced through filtration medium 70. Fluid then passes through an upper access hole (such as, for example, upper access hole 67 as seen in FIG. 6) into outlet 16 of cap 12, and out of cap 12 back into a supply line through outflow source. Cap 12 preferably includes cap top 18 exposed outside of filter unit 10, cap top 18 providing access to couple and/or redirect the fluid supply. Cap 12 preferably comprises a water tight sealing segment.

Cap underside 20 is preferably maintained within filter unit 10 as pressurized, and preferably includes female coupling 22 that may include a boss 24 that can hold and mate with filter receiver 40 via male coupler 42. Male coupler 42 provides for a twist-on for certain candle-style or other containers known in the art, is preferably pass-through hollow, and may be internally supported by a support bar (such as, for example, support bar 41 of FIG. 1). Alternative couplers that may substitute for male coupler 42 include metal fingers, or releases fit for known housings. In this embodiment, cap 12 may mate with container 32 via threading 28, 38. In other embodiments, cap 12 may be installed into a water line, and allows for direct emplacement of the container and/or filter intake cap 12. O-ring 43 may be provided to create seal between filter receiver 40 and cap 12. Furthermore, gasket 39 may be used to secure boss 24 and/or other portions of cap underside 20 with shield 44. Shield 44 may include shelf 49 to provide a mating surface for gasket 39 against cap underside 20, or a mating feature in cap 12. Alternatively, gasket 39 may provide direct mating with the supply flow (in embodiments where filter receiver 40 obviates need for cap 12, and filter receiver 40 mates directly with the supply. Cap 12 includes sidewalls 26 with interior sidewall threads 28 complementary with rim threads 38 of container rim 35. Container interior wall 34 captures and forces the high pressure required to force fluid into filter receiver 40 from the container space 33 through filtration medium 70.

Figure 8:
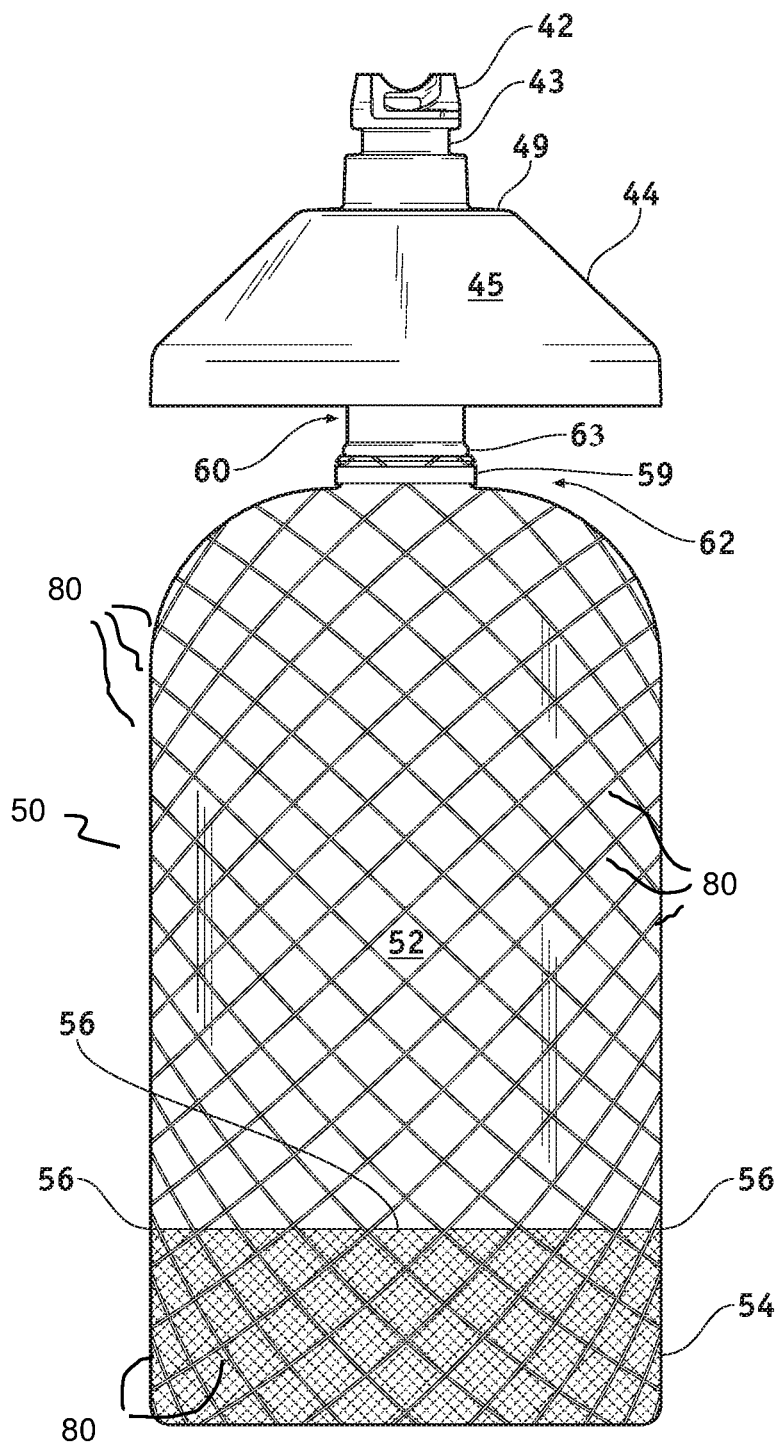
FIG. 8 illustrates a side view of a filter receiver with an attached filtration bag consistent with an embodiment of the present disclosure.

As seen in FIGS. 7 and 8, retention bag 50 is generally configured to couple with filter receiver 40. Retention bag 50 includes a cinch point 59 that be coupled via cinch 58 to neck 62 of tube 60. Cinch 58 preferably provides a fluid-tight seal to prevent fluid from entering around retention bag 50 and avoiding proper contact with filtration medium 70. Thus, cinch 58 preferably includes a fluid-proof material. Preferred cinches include a Herbie clip heavy duty double-gripping nylon hose clamp, spring steel clips, zip ties, or other cinches known in the art to provide a seal over filter receivers. Retention bag 50 is generally bi-modal, in that it comprises upper section 52 and lower section 54, wherein material properties of upper section 52 differ from those of lower section 54. Fluid cannot pass through upper section 52 to enter retention bag 50 since upper section 52 is impermeable to fluid. However, lower section 54 provides a permeable material, preferably an elastic mesh, wherein fluid may enter into retention bag 50. Upper section 52 and lower section 54 are preferably fixed together at seam 56 circumscribing retention bag 50. Seam 56 may include a heat seal, and should also be impermeable to fluids. Seam 56 is preferably a minimum height, such as at least one-quarter inch in height, to ensure proper sealing of the two separable bag sections. In alternative arrangements, the seal merely provides to distinguish between the reinforced (impermeable) section and the unreinforced (permeable) section of a single retention bag 50. As can be seen in FIG. 8, retention bag 50 may be surrounded in a netting to exert compressive pressure onto retention bag 50 and its contents. It is preferable that retention bag 50 is made of a compressible, elastic material, such as a compression fabric as is known in the apparel arts. Preferably, upper section 52 is made of an elastic material, but impermeable, preferably via coating with an impermeable material, such as a complete layer of polyurethane or similar coating. Wire netting 80 may be provided on the exterior of retention bag 50 to provide additional support and form. Wire netting 80 is preferably mostly inelastic, and may be woven to provide a net within which retention bag 50 may be contained and/or shaped. Wire netting 80 may be a metal, or a stiff plastic, or the like.

Preferably, materials for lower section 54 include polyurethane elastomers, such as SPANDEX, or the like. Lower section 54 may be made of a two-way stretch material, and may be set at a fifty micron mesh (particles greater than 50 microns would remain outside retention bag 50, and need to be flushed upon routine maintenance). Lower layer 54 may include a 5- to 100-micron rating so long as the size of the passages through the lower section 54 serve the dual function of allowing fluid to flow into the filtration medium, while at the same time preventing catastrophic escape of the filtration medium 70 out of retention bag 50. Upper section 52 of retention bag 50 is preferably water-tight and impermeable. Water is intended to press against upper section 52 to provide some pressure against filtration medium 70 within retention bag 50. Furthermore, upper section 52 is preferably of an elastic material that too provides inward pressure on filtration medium 70. Upper section 52 may also be made from a polyurethane elastomer, such as lower section 54, but with a water tight coating on the outside, through, and/or on the inside thereof. Thus, retention bag 50 compresses the filtration medium 70 housed therein. For instance, filtration medium 70 may include a granulated activated carbon, employed to remove organic materials and chlorine, etc. Granulated carbon may be often to forty microns in size, limiting the permeable mesh size of the permeable layer. In some embodiments, retention bag 50 is made of a single permeable material, whereas in other embodiments, retention bag 50 may be made of two, three, or more sections each comprising a different permeability rating.

Figure 9:
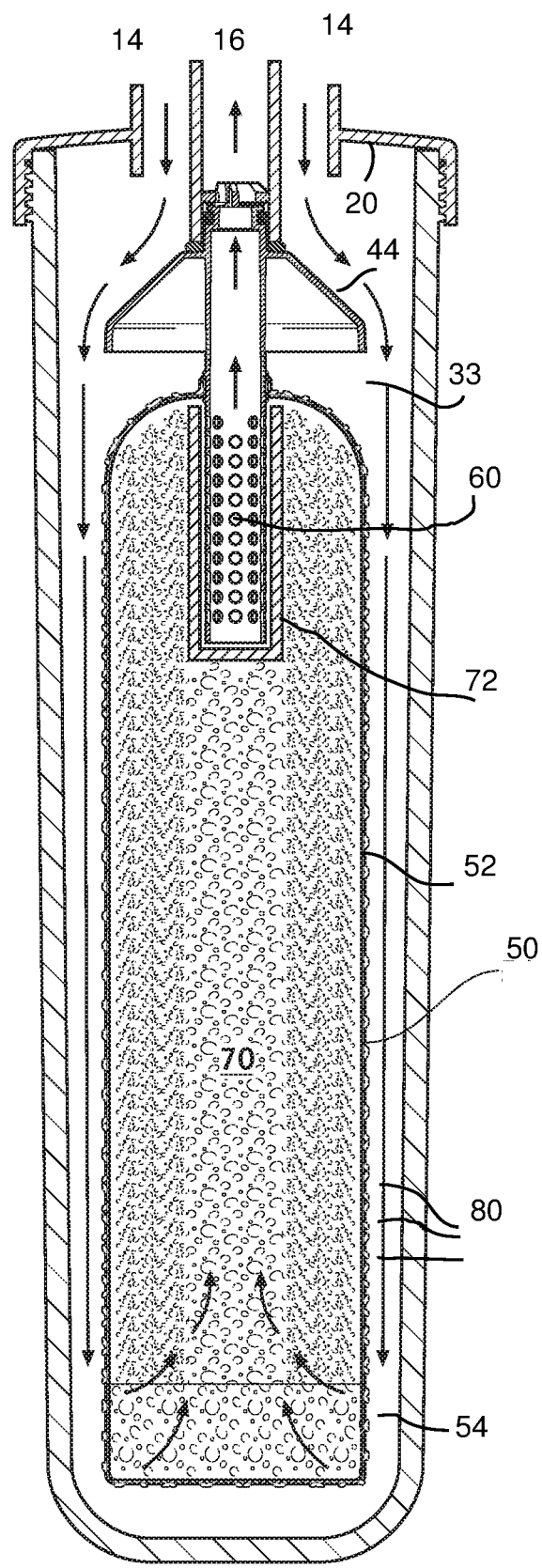
FIG. 9 illustrates a cross-sectional side view of a filter receiver encapsulated in a container demonstrating fluid motion.

Referring now to FIG. 9, fluid flow is designated by arrows. Fluid enters filter receiver 40 via inlet 14 and exits via outlet 16. Fluid flows past shield 44 and fills container general 33. Fluid is prevented from passing through upper section 52 (which is fluid-impervious) by bypassing lower section 54. As a result, building pressure from water supply forces fluid through lower section 54 (which is fluid-pervious) into and through filtration medium 70. Fluid passes from lower section 54 into and through filtration medium 70 where it meets cover 72. Cover 72 preferably encloses all of the apertures (such as apertures 64) to prevent particles in filtration medium 70 from exiting filter unit 10. Additional filtration may occur at cover 72. Cover 72 is intended primarily to prevent filtration medium 70 from entering into tube 60, but may also be made of a permeable material that can otherwise complement the filtration process performed by filtration medium 70. Cover 72 may be made of a woven, or non-woven fabric, such as a polypropylene polyester, etc. In some embodiments, cover 72 may be made of a foam, or foam media matrix, such as foam-mounted KDF, a foam slurry including KDF foam, or otherwise as is known in the art.

Cover 72 may include a smaller scale filtration, such as at 10 microns, to perform both steps of precluding passage of carbon granules of possible filtration medium 70, while allowing passage of fluids. In some embodiments, cover 72 will capture fine material, or dust, cast by filtration medium 70; in other embodiments, it may be more permeable to allow dust to pass. When cover 72 is adapted to allow passage of dust, it is preferred that a second module containing a fine particulate or sediment filter, such as bound and/or spun polypropylene thread into a high density filter, as are known in the art. Cover 72 may be made of a filtration medium compacted into a set form, such as impregnated KDF foam with 5-10 micron rating (for instance, for treatment regarding lead, soluble heavy metals, chlorine, chloramine, etc.). In such an embodiment, filtration medium 70 may be a granulated activated carbon and/or other similar filtration media known in the art, and such filter may be employed as a single stage, or part of a larger multi-stage system. Cover 72 may include a plate bottom 74 and radial sidewalls 76. Alternative embodiments of cover 72 may include portions exterior to tube 60, and a portion extending into tube 60, such as a rising post extending upward from the cover bottom and fitting snugly within tube 60, to contact an interior wall(s) of tube 60. In such an extended cover system (not shown), the distance of the fluid flow path through the treatment cover is increased.

Fluid is forced to pass through the lower section 54 and through a length of filtration medium 70 prior to encountering cover 72. This pathway enhances the length through which fluid is exposed to filtration. Additionally, given that retention bag 50 is made of a compression material, filtration medium 70 is under constant stress, not only from passing fluid, but also physical compression from retention bag 50. As filtration medium 70 may break down, a volume required to house filtration medium 70 may be reduced. In prior art filtration systems using similar filtration medium, gaps, holes, or channels may be formed in the filtration medium as it deteriorates over time. By adding a compression fabric in retention bag 50, any forming filtration medium channels, etc. are collapsed and thus advantageously prevented from providing free flow of fluid and therefore bypass of treatment.

As used herein, "elastic material" refers to one of a plurality of materials generally considered by those skilled in the art to have a relatively high elasticity. Examples of elastic materials include SPANDEX, rubber, polyurethane elastomers, etc.

The following examples pertain to further embodiments. The following examples of the present disclosure may comprise subject material such as an apparatus and/or a system including a filtration receiver.

According to example 1, there is provided a fluid filtration system. The fluid filtration system may comprise a fluid inlet adapted to direct fluid into a containment housing, a filter adapted to receive, treat, and expel the fluid, said filter including a filtration medium encapsulated within a bi-modal filtration bag, said bi-modal filtration bag having an upper fluid-impermeable layer, and a lower fluid-permeable layer coupled to said upper impermeable layer via a seal, said filtration bag comprising an elastic material, a filter intake receiver comprising a hollow tube with a central cavity in fluid communication with a fluid outlet, said filtration bag coupled over at least a portion of said filter intake receiver.

Example 2 may include the elements of example 1, wherein said at least a portion of said filter intake receiver comprises apertures adapted to allow passage of treated fluid into said hollow tube.

Example 3 may include the elements of example 2, further comprising a cover placed over said apertures, said cover set between said apertures and said filtration medium.

Example 4 may include the elements of example 3, wherein said cover is fluid-permeable.

Example 5 may include the elements of example 4, wherein said cover comprises additional treatment material.

Example 6 may include the elements of any of examples 1 to 5, wherein said filter intake receiver further comprises a shield set in the direct path from the fluid inlet and the filtration bag.

Example 7 may include the elements of any of examples 1 to 6, wherein said lower permeable layer comprises an elastic compression material.

Example 8 may include the elements of example 7, wherein said filtration medium comprises granules under compression stress at least in part due to compression forces emplaced by said lower permeable layer.

Example 9 may include the elements of any of examples 1 to 8, further comprising a cinch emplaced over at least a portion of said upper impermeable layer to affix said upper impermeable layer to a neck of said hollow tube.

According to example 10 there is provided a filter for the treatment of fluid. The filter may comprise a filter intake receiver, said filter intake receiver including a mounting coupler adapted to mate with a portion of a container, a hollow tube extending along a longitudinal axis, said hollow tube comprising at least one aperture, a filtration medium enclosed within a retaining bag, said retaining bag coupled to said filter intake receiver around said at least one aperture, wherein at least a portion of said retaining bag comprises a permeable material.

Example 11 may include the elements of example 10, wherein said retaining bag comprises a compression material, said compression material adapted to provide a compressing force on said filtration medium.

Example 12 may include the elements of any of examples 10 to 11, further comprising a cover set at least partially over and adjacent to said hollow tube; said cover in direct proximity to said at least one aperture.

Example 13 may include the elements of example 12, wherein said cover comprises a permeable foam.

Example 14 may include the elements of any of examples 12 or 13, wherein said cover set on a first and a second side of said at least one aperture.

Example 15 may include the elements of any of examples 11 to 14, wherein said retaining bag further comprises an impermeable material.

We claim:

1. A fluid filtration system comprising:
   a. a fluid inlet adapted to direct fluid into a container,
   b. a filter adapted to receive, treat, and expel the fluid, said filter including:
      i. a filtration medium encapsulated within a filtration bag, said filtration bag having an upper fluid-impermeable section and a lower fluid-permeable section coupled to said upper fluid-impermeable section;
      ii. said lower fluid-permeable section comprising an elastic compression material adapted to provide a compressing force on said filtration medium, said lower fluid-permeable section being more elastic than said upper fluid-impermeable section; and
   c. a filter intake receiver comprising a hollow tube with a central cavity in fluid communication with a fluid outlet; said filtration bag coupled over at least a portion of said filter intake receiver.

2. The fluid filtration system as set forth in claim 1 wherein said filtration medium comprises granules under compression stress at least in part due to compression forces emplaced by said lower fluid-permeable section.

3. The fluid filtration system as set forth in claim 1 further comprising a cinch emplaced over at least a portion of said upper fluid-impermeable section to affix said upper fluid-impermeable section to a neck of said hollow tube.

4. The fluid filtration system as set forth in claim 1 wherein said filter intake receiver hollow tube is surrounded by said filtration medium.

5. The fluid filtration system as set forth in claim 1 wherein said filtration bag lower fluid-permeable section provides compressive force to said filtration medium.

6. The fluid filtration system as set forth in claim 1 wherein said filter intake receiver comprises a shield.

7. The fluid filtration system as set forth in claim 6 wherein said shield comprises a conical sectional shape.

8. A fluid filtration system comprising:
   a. a fluid inlet adapted to direct fluid into a container; and
   b. a filter adapted to receive, treat, and expel the fluid, said filter including:

i. a filtration medium encapsulated within a filtration bag, said filtration bag having an upper fluid-impermeable section and a lower fluid-permeable section coupled to said upper fluid-impermeable section;

ii. said filtration bag comprising an elastic compression material adapted to provide a compressing force on said filtration medium, wherein said lower fluid-permeable section is more elastic than said upper fluid-impermeable section so that the fluid pools in said lower fluid-permeable section; and c. a hollow tube with a central cavity in fluid communication with a fluid outlet, wherein said hollow tube includes a first distal end above said filtration bag and a second distal end within said upper fluid-impermeable section and above and spaced from said lower fluid-permeable section.

9. The fluid filtration system as set forth in claim 8 wherein said filtration medium comprises granules under compression stress at least in part due to longitudinal and radial compression forces emplaced by said lower fluid-permeable section.

10. The fluid filtration system as set forth in claim 8 further comprising a cinch emplaced over at least a portion of said upper fluid-impermeable section to affix said upper fluid-impermeable section to a neck of said hollow tube.

11. The fluid filtration system as set forth in claim 8 wherein said filtration bag lower fluid-permeable section provides compressive force to said filtration medium.

12. A fluid filtration system, comprising:

a fluid supply inlet, a fluid supply outlet, a container in fluid communication with the fluid supply inlet and outlet, a filter in the container and a hollow tube in the container; wherein the container receives fluid at the fluid supply inlet and expels the fluid at the fluid supply outlet;

the filter includes a filtration bag and a filtration medium;

the filtration bag includes a lower section that is fluid-permeable and an upper section that is fluid-impermeable, wherein the lower section extends below upper section and the upper section extends above the lower section, and wherein the lower section is more elastic than the upper section;

the filtration medium is located in the lower and upper sections and treats the fluid;

the hollow tube extends into the filtration medium in the upper section, does not extend into the filtration medium in the lower section, and defines a longitudinal direction along its axis and a radial direction perpendicular to the longitudinal direction; and the fluid is forced to flow from the fluid supply inlet into the container, then through the lower section into the filtration bag without passing through the upper section, then into the filtration medium within the lower section in the longitudinal and radial directions, then from the filtration medium in the lower section into the filtration medium in the upper section in the longitudinal direction, then into the hollow tube and then into the fluid supply outlet.

13. The fluid filtration system as set forth in claim 12 wherein the filtration bag is a bi-modal structure and the lower and upper sections are separate sections sealed together by a seam that circumscribes the filtration bag.

14. The fluid filtration system as set forth in claim 12 wherein the lower and upper sections comprise an elastic fluid-permeable material, and the upper section is coated with a fluid-impermeable material on the elastic fluid-permeable material.

15. The fluid filtration system as set forth in claim 14 wherein the elastic fluid-permeable material is a polyurethane.

16. The fluid filtration system as set forth in claim 12 wherein the upper section has at least twice a length of the lower section in the longitudinal direction and the upper and lower sections have the same width in the radial direction.

17. The fluid filtration system as set forth in claim 12 wherein the fluid in the container outside the filtration bag presses against the lower section to provide pressure against the filtration medium in the longitudinal and radial directions and against the upper section to apply pressure against the filtration medium in the radial direction.

18. The fluid filtration system as set forth in claim 12 wherein the fluid filtration system is an in-line filter system for potable water treatment and the fluid is water.

19. The fluid filtration system as set forth in claim 18 wherein filter medium includes granulated activated carbon to remove organic materials and chlorine from the water.

* * * * *